United States Patent [19]

Wallace

[11] Patent Number: 4,501,041
[45] Date of Patent: Feb. 26, 1985

[54] PROCESS OF FORMING FRICTION

[75] Inventor: Richard B. Wallace, Bloomfield Hills, Mich.

[73] Assignee: The Oakland Corporation, Troy, Mich.

[21] Appl. No.: 499,260

[22] Filed: May 31, 1983

[51] Int. Cl.$^3$ .......................... B21D 53/24; B21K 1/64
[52] U.S. Cl. .................................................. 10/86 A
[58] Field of Search .................. 10/10 P, 27 R, 86 A; 411/301, 302, 303, 304, 427, 436; 118/56, 57, 418, 423, 426, 428, 408

[56] References Cited

U.S. PATENT DOCUMENTS

| | | | |
|---|---|---|---|
| 2,989,107 | 6/1961 | James et al. | 411/301 |
| 3,294,139 | 12/1966 | Preziosi | 10/10 P X |
| 3,416,492 | 12/1968 | Greenleaf | 118/308 X |
| 3,568,746 | 3/1971 | Faroni et al. | 411/302 |
| 4,070,724 | 1/1978 | Newnom | 10/86 A X |
| 4,164,971 | 8/1979 | Strand | 10/86 A X |
| 4,262,038 | 4/1981 | Wallace | 10/10 P X |
| 4,279,943 | 7/1981 | Wallace | 118/408 X |
| 4,321,885 | 3/1982 | Wallace | 118/408 X |
| 4,399,828 | 8/1983 | Kontos | 118/418 X |

FOREIGN PATENT DOCUMENTS 690770  4/1953  United Kingdom ................ 411/302

*Primary Examiner*—E. Michael Combs
*Attorney, Agent, or Firm*—Barnes, Kisselle, Raisch, Choate, Whittemore & Hulbert

[57] ABSTRACT

A novel friction nut having friction material substantially filling the interior thread groove from end to end except for substantially less than a full convolution at one or both ends, in which the thickness of the deposit of friction material does not substantially exceed the normal thread clearance with a mating part. The method for producing the nut comprises filling the thread groove from end to end and then displacing and shaping the deposit in the end of the thread groove to provide for ready initial threaded engagement with a mating part by inserting and rotating the end of a threaded tool conforming to the threaded tool conforming to the threaded end of a mating part, and limiting threaded advance of the tool into the nut to about one-half of a full turn. Economical mass production of this nut is accomplished by a method and apparatus in which the nuts are tumbled in bulk in a fluid slurry of thermoplastic resin particles, then tumbled in a drum having a spongy liner to remove the dry or partly dried slurry from the nut exterior prior to shaping the deposit and finally in heating the nuts with the shaped deposits therein in bulk in a furance to fuse the thermoplastic particles into a solid resin deposit. The apparatus for shaping the deposit preferably comprises means for advancing and rotating tools conforming the ends of mating threaded parts simultaneously into opposite ends of the threaded opening, limiting threaded advance to less than a full turn, and reversing rotation and tool travel to in effect unscrew the tools from the nut. The nuts as produced by the method described are novel in that the angular extent of cleared thread groove at the ends of the nut is less than previously obtainable.

9 Claims, 6 Drawing Figures

PROCESS OF FORMING FRICTION

BRIEF SUMMARY

The present invention may be considered as an advance over my prior U.S. Pat. No. 4,279,943 and 4,321,885.

The use of a friction material deposited in the thread grooves of threaded members, including thermoplastic resin polymers, in which the resin is fused to the thread surfaces is well known. A commonly used resin for this purpose is nylon. It has been applied in powder form to fasteners previously heated to a temperature sufficient to fuse the resin as it is deposited on the thread surfaces, as disclosed in Preziosi U.S. Pat. No. 3,294,139. Alternatively, the powdered resin is applied to and retained on the fastener, which is thereafter heated to fuse the powdered resin, as disclosed in Greenleaf U.S. Pat. No. 3,416,492.

More recently, as disclosed in my prior patents identified above, the thermoplastic resin particles have been applied to threads in a fluid slurry, which, when dried, leave a coherent deposit formed of individual discrete resin particles. When heated, these particles fuse into a solid mass which at the same time is fused to the adjacent surfaces.

A problem has been presented in the production of friction nuts, particularly in smaller sizes.

In the first place, a requirement is that sufficient thread formation at the end of the nut which receives the end of the mating part, be clear of any substantial deposit of friction material to permit substantially torque-free initial-thread engagement so that the parts may be manually engaged. This reduces the length of thread groove in which the friction material may be deposited. The problem, of course, is exacerbated when it is a requirement that both ends of the nut shall provide substantially torque-free initial thread engagement with the mating part.

Typical ⅜-16 nuts, as a specific example, have about five complete thread convolutions. Each end of the nut requires up to a one half turn of substantially clear thread groove (for finger engagement of the mating part) which means that at the theoretical best, only about four convolutions remain for receiving the friction material. Prior to the present invention, precise control of the length or angular amount of thread groove left clear has not been possible, so that to ensure positive half turn finger free engagement of the threaded parts more commonly ¾ turns are left free. This leaves on about 3 ½ convolutions available for receiving the full depth deposit.

This in turn has led to further difficulties. With a shorter length of thread groove available a thicker deposit of friction material was sought to keep the torque up to specification. This produces a tendency for the entering end of the bolt to shear the resin from the thread groove and to displace it ahead of the bolt and out of the threaded bore of the nut.

The present invention permits lesser levels of friction interference over a greater length or area, while retaining the resin in place, rather than in some cases shearing it away. This provides for a more consistant torque from part to part, and also for reusability.

In accordance with the present invention, the thread grooves are substantially filled with the nylon slurry, from end to end thereof. Thereafter, with the slurry completely dried to a coherent mass of discrete particles, or at least substantially dried to a condition in which it form retaining, the deposit of material in at least one end is accurately shaped to displace the deposited material for a controlled length of thread groove equivalent to not substantially more than one half turn, and preferably less, after threaded engagement with the mating bolt.

This is accomplished by advancing and rotating a shaping tool which is a substantial duplicate of the threaded entering end of a bolt which is the mating threaded part. The relative rotation between the tool and nut after initial threaded engagement is attained may be accurately controlled.

The end of the material remaining in the thread grooves, as measured along the groove, may be inclined, as for example about 45° to provide a ramp engagement with the entering end of the thread on the mating bolt, this will eliminate or reduce any tendency for the thread on the bolt to strip the friction material from the thread groove as the parts are threaded fully together.

By starting with all thread grooves full of resin deposit, and by shaping the resin with a duplicate of the thread shape, which will be present on the bolt, there is left at the very earliest evidence of a thread at the end face of a nut, a small amount of resin (after shaping) that will represent the clearance between the confronting surface of the nut and bolt, or between the major diameter (the root diameter) of the nut thread and the major diameter (the crest diameter) of the bolt thread. After the fusion, there will be a minor locking effect as the full sized major diameter of the bolt comes into position after full engagement with the nut thread.

The barest evidence of the nut thread has been described as it appears at the actual nut face on the chamfer usually provided. From the beginning of the nut thread, there is an immediate and continuous growth of the thread form as it traverses the usual chamfer. Coupling this with the chamfer (for example, 45°) of the shaping tool, it simply means that a tapered but useful amount of friction material will extend fully throughout the thread groove of the nut, while still permitting the required finger engagement of nut to bolt.

The ability to convert existing nuts, and to provide for double-ended use of standard nuts, makes for significant economic advantage. In the past, so much of the thread length was consumed that for standard nut heights there was often no choice but to make them oneway or single ended nuts.

In addition to the feature of initially filling the thread grooves for substantially the full thickness or height of the nut, the present invention provides for an improved method of providing the deposit of friction material in a bulk treatment process which avoids the previous production line process in which nuts were advanced single file for individual treatment.

In the improved method, nuts are tumbled in bulk in a fairly thick slurry contained in a rotating barrel, from which they emerge with the exterior surfaces of the nuts coated with slurry as well as the thread grooves filled. The thread grooves are substantially filled, but otherwise the openings through the nuts are clear. Thereafter, the coated nuts are tumbled in bulk in a rotating drum lined with a layer of spongy or foamed material. This removes all deposit from the nut exteriors, leaving the deposit within the thread grooves intact. The removed material, usually a powder, is carried around by the drum past a suction device adjacent the top of the drum which continuously removes it.

Following the accurate shaping of the deposit of the thermoplastic particles, the nuts are completed by heating the bulk, thus greatly reducing the energy requirement over that which would be required for single file advance through a heating station.

On cooling, the resin particles are fused into a solid continuous body having a desire yieldability and friction characteristics of the selected resin, typically nylon.

DETAILED DESCRIPTION

The method of the present invention is capable of being carried out by apparatus designed for quantity production.

Figure 1:
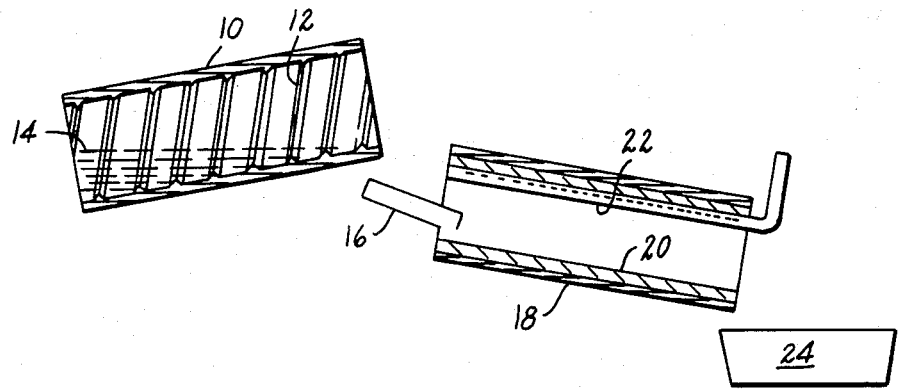
FIG. 1 is an exploded diagrammetric view, partly in section of apparatus employed in filling thread grooves.

As best seen in FIG. 1, a tumbling drum 10 is provided on its interior surface with one or more helical ribs 12 inclined such that rotation of the drum advances nuts contained therein from left to right. The drum is partly filled with fluid material in the form of a slurry of thermoplastic particles, a suitable resin for this purpose being nylon. The slurry as seen at 14 leaves the right hand end of the drum open to permit the coated nuts to be advanced out the upper end of the drum at the right in the figure.

The tumbling of the nuts in the fluid slurry, which has a fairly thick, pasty consistency, coats all outside surfaces of the nuts and in addition fills the thread grooves within their interior, while leaving the interior radially inwardly of the crests of the threads free of slurry.

Figure 3:
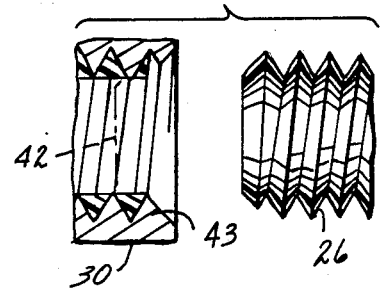
FIG. 3 is an enlarged view showing a tool end and associated nut.
Figure 4:
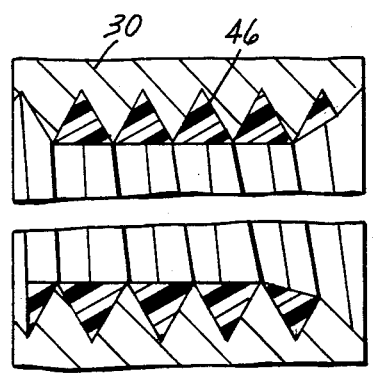
FIG. 4 is a further enlargement of a nut according to the present invention.

As the coated nuts emerge from the barrel 10 they may be discharged onto a transfer shelf 16 from which they slide by gravity into a cleaning barrel 18. Barrel 18 is lined with a soft spongy material, such as a cured resin foam, shown at 20. The barrel is rotated and the coated nuts are tumbled against the lining, which cleans and completely removed all of the coating of the slurry on all exterior surfaces. However, the deposit within the thread grooves at the interior of the nuts is left intact. The consistency of the slurry is such that the interiors of the nuts, with the exception of the thread grooves, is left clear, as seen in FIGS. 3 and 4. The cleaned nuts are received in containers 24 for subsequent treatment.

The slurry removed from the exterior of the nuts by the tumbling in barrel 18 is for the most part in the form of a powder, which is carried around by the spongy lining and removed by suction means including an elongated perforated inlet nozzle 22 which extends along and adjacent the liner surface at the top of the drum.

In a final operation the dried slurry, which at this time, is a coherent mass of discrete particles, is fused by a bulk treatment in a furnace, thus effecting a substantial economy of energy over sequental treatment. As the resin particles reach fushion temperature, they become a continuous fluid which when cool becomes a solid continuous deposit of the resin, which is fused to the adjacent thread surfaces. The deposit of resin particles retains the shape and fills the thread grooves as illustrated in the figures.

It is essential that at least a partial thread convolution at one end and preferably at both ends of the finished nut be left clear of friction material so that it may be threadedly engaged manually in a substantially torque-free condition until enough of the thread convolution has been engaged to provide for further axial advance by relative rotation under controlled substantially increased torque conditions.

An essential feature of the present invention is the shaping of thc deposit of resin particles from the slurry, prior to the fusion thereof into a solid continuous mass of resin as contrasted with the cohesive mass of discrete particles. This is accomplished by advancing and rotating a forming tool 26 into one end of the nut as suggested in FIG. 3. Here the tool 26 has an end portion which may be identical with the entering end of the bolt for which the nut is intended. In fact, such bolts may be employed as the forming tools.

Figure 2:
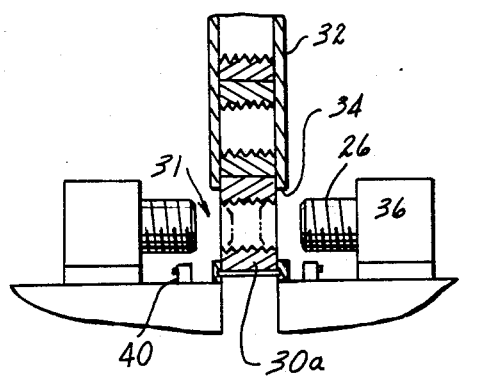
FIG. 2 is a vertical section of apparatus for clearing end thread convolution.

As best seen in FIG. 2, a succession of nuts 30 are advanced to a working station 31 here shown as occupied by the bottom nut 30a, in a chute 32, having openings 34 which expose both ends of the nut. At opposite sides of the nut 30 are provided tool supports 36 which include reversible drive means for rotating the tools 26 in opposite directions. Tool supports 35 are movable toward and away from nut 30. As each tool engages the deposit of resin particles filling the thread grooves 38 thereof, it displaces or removes the coherent deposit as the end of the thread as the end of the tool enters the thread groove of the nut and threadedly engages the threads thereof.

The structure diagrammatically shown in FIG. 2 is similar to a nut-tapping machine, except that the tool is not gashed to form a tap.

The apparatus of FIG. 2 includes sensitive adjustable switches 40 which are set to engage the tool supports 36 after the tools 26 have penetrated a precisely determinable amount into the nut. As previously indicated, this is an amount which preserves the maximum amount of full depth friction deposit consistent with finger-free initial threading of the nut at either end thereof with its cooperating bolt. Alternatively, of course, advancement of the supports 36 may be non-positive, and rigid abutments limit penetrating of the tools in the openings in the nuts.

It will be understood that when the switches 40 are tripped or axial advance of the tools otherwise arrested, rotation of the associated tool is instantly reversed, so that it is first in effect unscrewed or freed of its threaded engagement with the nut and then moved axially out of the way of the next nut to be advanced into the work station 31. Accordingly, the apparatus is responsive to penetration of the end of a tool into both ends of the nut, and hence will ensure that only so much of the coherent deposit of discrete particles is displaced, shaped or removed as to provide the accurately predetermined minimum of thread groove convolution free of friction material to effect the required initial finger-free thread engagement.

In FIG. 3, the dotted line 42, indicates the actual penetration of the end of the tool or nut end into the threaded interior of the nut 30. It will be understood that the critical factor is the angular length of thread groove which is cleared, or substantially cleared, of the coherent deposit of particles so that after conversion into a solid continuous resin material by fusion the nut will provide a corresponding angular threaded engagement with the thread of the bolt under substantially torque-free or finger-free conditions. This is controlled by providing a corresponding penetration of the leading end of the thread on the clearing tool into the thread groove of the nut as it is initiated on the conical chamfer 43. This, of course, results in leaving precisely this angular length of thread groove at its end substantially free of solid fused friction material.

If the material is displaced from the thread groove of the nut by the end of a bolt having a predetermined thread clearance with respect to the nut, there may remain a thin deposit of the coherent resin particles on the thread surfaces at the end of the nut. This thin deposit is, of course, shaped to conform to the bolt or tool thread, and will result in a relatively small friction as the nut is initially manually engaged with the end of a bolt.

It is recognized that commercial nuts and bolts are usually formed with tapered or chamfered ends. The tap which cuts the threads in the nut initially engage the chamfered surface 43, commonly a 45° chamfer, at root diameter and the threads increase to full height as the tap traverses the chamfer. The bolt used with the nut has the identical form of the tool, and it will ordinarily have a similarly chamfered end, on which the threads increase to full height.

The present invention provides for automatic provision for a minimum angular thread engagement by in effect screwing the tool into the threaded interior of the nut with a corresponding angular advance in threaded engagement.

Figure 5:
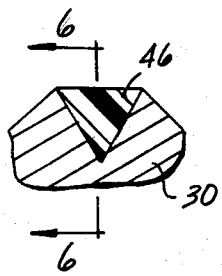
FIG. 5 is a fragmentary section through a thread groove.
Figure 6:
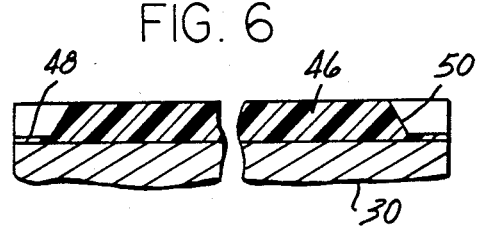
FIG. 6 is a longitudinal sectional view on the line 6—6, with the helical thread groove developed into a straight line.

Referring now to FIGS. 5 and 6, there is indicated at 46 in FIG. 5 the friction material completely filling the thread groove 46 of the nut 30. In FIG. 6, there is illustrated the condition at the ends of the thread groove, where there is illustrated a thin deposit at 48 which remains because of the clearance between the nut thread and the thread of the bolt or identical tool. In use, of course, the bolt will contact the surface of the deposit 48 after fusion, and provides a small but finger-free friction effect.

In this figure, there is also illustrated diagrammatically an inclined ramp surface at 50 on the ends of the full depth friction deposit. This ramp surface avoids any tendency for the end of the advancing bolt thread to shear away the full depth deposit 46 as the nut and bolt become fully threadedly engaged.

It is emphasized that the initial deposit of slurry and removal from the exterior of the nuts is essentially a batch type operation in which a large number of nuts are treated simultaneously. Similarly, the final fusing operation is a batch type operation since the friction material during fusion is protected within the threaded opening in the nuts.

Only the precise shaping of the ends of the deposit of adhesive particles by causing the mating threads on the tools to penetrate a predetermined angular distance into the thread grooves of the nuts requires separate operations on each nut, and this is carried out on apparatus which is obviously readily automated and in addition operates at both ends of a nut simultaneously.

It will be understood that in shaping the deposited resin material in the ends of the thread grooves, the penetration of the ends of the tool into the threaded interior of the nut is that amount required to provide not substantially more than one half turn of relative rotation after a threaded interlocking engagement has been achieved. Accordingly, as the nut is first threadedly engaged with the end of a bolt substantially or exactly identical with the forming tool, not more than a one half turn between the nut and bolt, accompanied, of course, by the resulting relative axial advance, takes place before the bolt thread encounters the full depth deposit of friction material in the thread groove of the nut. Therefore, as the nut and bolt are brought into threaded engagement, the action is finger-free until the thread surfaces of the nut and bolt are brought into assured cooperating threaded engagement such that axial separation without relative rotation is prevented, and that further relative rotation results in the corresponding axial advance.

It will be understood that as the tool (or tools) 26 is advanced to enter the open end of the nut, and is rotated, axial advance is arrested until the entering end of the thread on the tool enters into the thread grooves of the nut. Thereafter, further advance of the tool is determined by relative rotation between the tool and nut, and during this relative rotation, the end of the thread on the tool moves along the helical thread groove until the resulting axial advance of the tool trips the reversing switch 40. As the direction of rotation of the tool is reversed, so also is its axial movement which is a positive retraction or reverse axial movement of the tool until the threaded intergagement between tool and nut is terminated.

Accordingly, the rotation of the tool in forward or reverse direction is positive, but the advance and retraction of the tool support 36 is non-positive. When the tool is "unscrewed" from the nut, it is moved away from the nut by non-positive traverse means (not shown) connected to the tool support 36.

After the finished nut is replaced, the direction of rotation of the tool is reversed and it is advanced into contact with the next nut, where its further advance is arrested until the thread of the tool enters the thread groove of the nut. At this time, further advance is the result of relative rotation between thread surfaces until limit switch 40 is tripped. This occurs only after the deposit of coherent resin particles has been shaped or displaced from a controlled angular extent of the thread groove, not substantially more than 180°.

Accordingly, after the resin deposit has been fused, the nut may be threaded onto the end of a bolt in finger-free condition and rotated in threaded engagement therewith by the same angular amount.

The angular amount of thread groove is disclosed herein as controlled by sensing or controlling axial movement, and this has been found satisfactory. It is recognized, however, that equivalent results could be obtained by sensing rotation of the tool after the positive thread engagement between tool and nut has been achieved.

The finger-free condition referred to is recognized in the art as the condition in which manual rotation of the nut in threaded engagement with the bolt is permitted.

I claim:

1. The method of making friction nuts which have their internal thread groove convolutions substantially filled from end to end except for substantially less than a full convolution at at least one end thereof which comprises substantially filling the thread groove convolutions in the nuts from end to end with fluid slurry consisting of thermoplastic resin particles and a liquid carrier while leaving the opening through the nut radially inwardly of the thread crests substantially clear, drying the slurry to leave within the thread grooves a form-sustaining deposit consisting of a coherent mass of resin particles, threadedly engaging a tool having a threaded end conforming substantially to the end of the mating member with which the nut is to be used with each nut, thereafter effecting a controlled relative rotation and advance between the nut and tool of equivalent to substantially less than a full turn of threaded engagement to displace friction material from the end of the thread groove convolution in the nut to shape the deposit to provide for substantially free initial engagement between the nuts and their mating part.

2. The method as defined in claim 1, which comprises after shaping the deposit heating the deposit to fuse the resin, and cooling the fused resin to provide a solid resin deposit fused to the adjacent thread surfaces.

3. The method as defined in claim 1, which comprises shaping both ends of the deposit of friction material by engaging tools simultaneously with the nut thread at both ends thereof.

4. The method as defined in claim 1, which comprises filling the thread groove in the nuts by tumbling the nuts in the slurry to coat all exterior surfaces of the nuts and to fill the thread grooves thereof from end to end.

5. The method as defined in claim 4, which comprises thereafter tumbling the nuts in a container lined with a spongy material to remove the deposited friction material from all exterior surfaces of the nuts.

6. The method as defined in claim 5, in which the container is a rotating drum and which comprises carrying away the friction material removed from the nuts by suction means applied to the spongy material at the top of the rotating drum.

7. The method as defined in claim 1, in which the friction material initially deposited in the thread groove convolutions is a fluid slurry of particles of a resin polymer, which comprises at least substantially drying the slurry prior to shaping the deposit, and after shaping the deposit heating the deposit to fuse the resin, and cooling the fused resin to provide a solid resin deposit fused to the adjacent thread surfaces, which comprises fusing the resin remaining in the thread grooves by heating the nuts in bulk and in random position in a furnace.

8. The method as defined in claim 1 in which the end thread at said threaded end of said tool has a ramp-forming portion for shaping the end of said deposit in the thread groove of the nut to provide an inclined ramp gradually engagable with the threaded end on a mating bolt.

9. The method as defined in claim 8 in which said end thread is further provided with a clearance with respect to said thread grove in said nut for leaving a thin deposit of said friction material between said ramp and the end of said thread groove in said nut.

* * * * *